Figure 1:
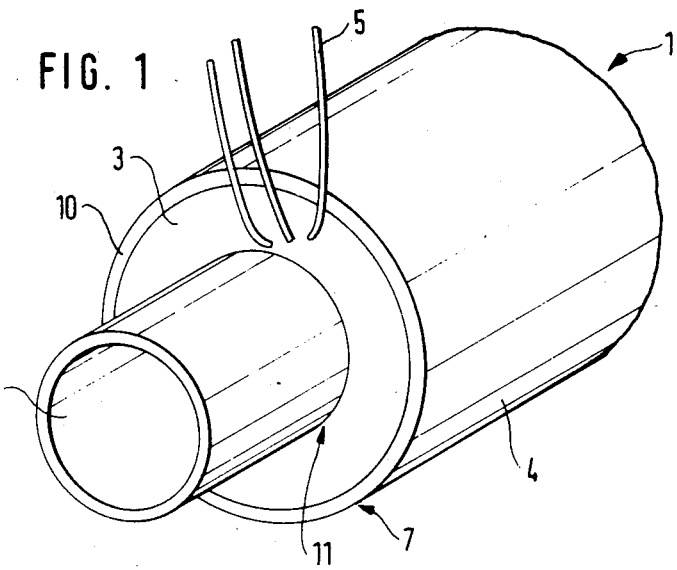

United States Patent [19]
Persson

[11] Patent Number: 4,576,661
[45] Date of Patent: Mar. 18, 1986

[54] PROCESS FOR SEALING THE END OF INSULATED PIPES WHICH HAVE A NUMBER OF MONITORING WIRES, AND MEANS FOR CARRYING OUT THE PROCESS

[76] Inventor: Thomas B. Persson, Västra Söbacken 27, 444 00 Stenungsund, Sweden

[21] Appl. No.: 599,519

[22] Filed: Apr. 12, 1984

[30] Foreign Application Priority Data

May 26, 1983 [SE] Sweden .............................. 8302960

[51] Int. Cl.⁴ ............................................ H01B 13/06
[52] U.S. Cl. ....................................... 156/48; 138/89; 156/294; 156/337; 165/180; 166/91; 174/76; 174/77 R; 219/301; 427/120
[58] Field of Search .................. 29/157.3 H, 157.3 R, 29/858; 138/89, 109; 156/48, 294, 337; 165/177, 180; 166/61; 174/74 A, 76, 77 R; 219/300, 301; 427/120

[56] References Cited

U.S. PATENT DOCUMENTS

| | | | |
|---|---|---|---|
| 549,995 | 11/1895 | Cummings | 174/77 R X |
| 3,377,464 | 4/1968 | Rolfes | 219/301 |
| 4,288,471 | 9/1981 | Lanier | 174/74 A X |
| 4,444,996 | 4/1984 | Robertson | 174/76 X |

Primary Examiner—Robert A. Dawson
Attorney, Agent, or Firm—Balogh, Osann, Kramer, Dvorak, Genova & Traub

[57] ABSTRACT

The structure and process for providing a sealed insulated piping arrangement by introducing a molten sealing material between the inner fluid conducting pipe, and an outer casing, which space may include monitoring wires. The sealing material is introduced in a molten state to provide a liquid-impermeable filling, and then providing an enclosing seal at the end with a smooth transition for passage of the monitoring wires.

8 Claims, 4 Drawing Figures

PROCESS FOR SEALING THE END OF INSULATED PIPES WHICH HAVE A NUMBER OF MONITORING WIRES, AND MEANS FOR CARRYING OUT THE PROCESS

The present invention relates to a process for sealing the end of insulated pipes, i.e. so-called hot pipes, which have a number of monitoring wires extending along the pipe between an inner fluid-transporting pipe and a casing which surrounds insulation, out past the insulation on the said pipe.

It is already known in insulated pipes of the above-mentioned type without monitoring wires to accomplish the so-called end sealing by shrinking on an end seal made of a plastic material, by heat-shrinking the sealing material on. This is done with the aim of trying to achieve an effective seal between the environment and the enclosed, liquid-absorbing insulating material to provide a so-called "watertight bulkhead" at the ends of the pipe between pipes laid, for example, in conduits, and to prevent moisture from penetrating into it during the time that the pipes are lying in the conduits or being stored, respectively.

The practice of using monitoring wires in hot pipes of the said type is well-known, but it has not previously been possible to solve the sealing problem with such pipes in a simple and effective way. Although a temporary cover can be put over the respective ends of the pipe, this has proved to be expensive, and since the cover is taken off before connecting the pipes together, a so-called "water-tight bulkhead" could not be formed by this method.

The main object of the present invention is therefore primarily to provide a process which solves the said problem in an effective manner.

The said object is achieved by means of a process according to the present invention which is essentially characterised in that a sealing material in a flowing state, heated to an appropriate temperature, is applied over the said end of the pipe so that a liquid-impermeable layer is formed between the edges of the casing and the fluid-transporting pipe, connecting them together, and providing an enclosing seal with smooth transitions at the respective monitoring wires.

A further object of the invention is to provide means for carrying out the said process. The said further object is accomplished by using means whereby the end seal is formed of a heat-resistant bitumen-containing material which forms a liquid-impermeable layer after application.

Figure 2:
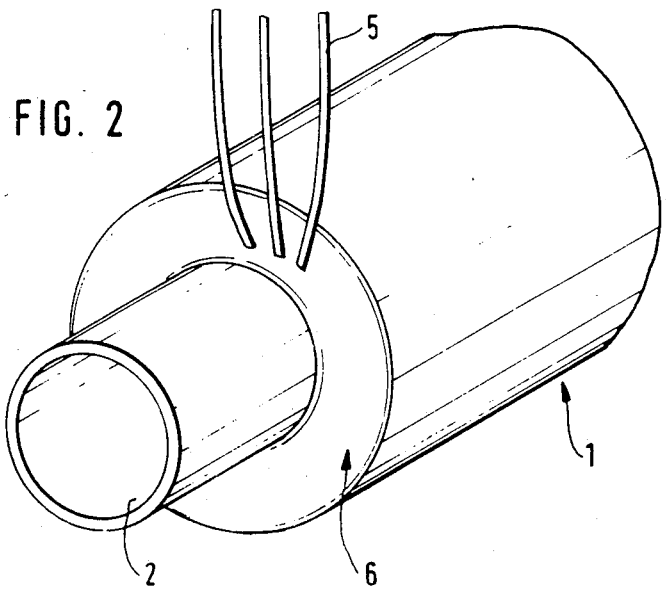
Figure 3:
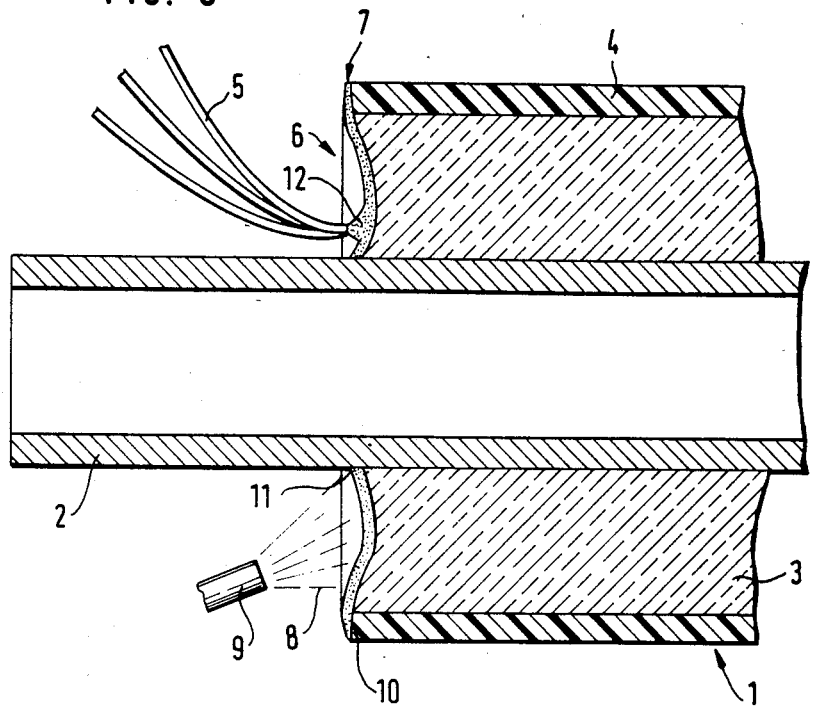
Figure 4:
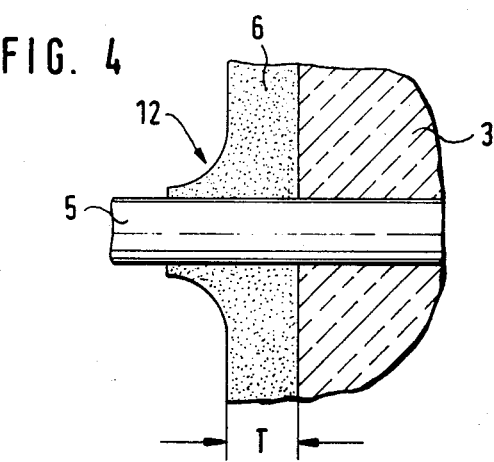

The invention is described below by way of a preferred embodiment example with reference to the accompanying drawings, on which FIG. 1 shows one end of a pipe of this kind for which the sealing process according to the invention is designed to be used, FIG. 2 shows the end of the pipe after the sealing process has been completed, FIG. 3 shows a section through the end of the pipe and a seal which has been formed, and FIG. 4 shows in detail the seal in the region where a monitoring wire emerges from the pipe.

A plurality of insulated pipes 1, i.e. so-called hot pipes, each consisting of an inner pipe 2 preferably made of copper, surrounded by insulation 3 of a suitable kind and a casing 4 made, for example, of plastic material, are intended to be assembled together to enable fluid to be transported between different places through the inner pipes 2. The pipes 1 are expediently laid in so-called conduits, and after the inner pipes 2 have been joined together by soldering, for example, the upper parts of the respective conduits are closed after insulation has been applied, for example as shown in SE C 7907647-7, by injecting insulation inside a covering casing part.

A number of monitoring wires 5 extend along each of the said pipes 1 in the insulation 3 appertaining thereto, which may consist of a plastic material, glass wool or some other suitable insulating material which prevents heat losses from the fluid which is being transported in the pipes 2. The said wires 5 are connected together to extend along the laid pipelines and have the task of detecting and warning of any damp which may possibly arise in the pipe insulation 3, occasioned by leakage from outside or of the fluid in the pipes 2.

According to the invention, before the pipes 1 are delivered to the site where they are to be laid a seal 6 is applied to the respective ends 7 of the pipe with a view to preventing moisture from penetrating into the said insulation 3. The said seal 6 functions equally effectively both before the separate pipes 1 are joined together and after they have been joined together. The seal 6 expediently consists of a sealing material 8 which contains bitumen, or preferably a mixture of wax and bitumen. The sealing material 8 which sets when it cools down has to be heated up before it can be applied to the end 7 of the pipe, and it is preferably heated up to approximately 160° C. In the example shown the sealing material 8 is applied by spraying it via a spray nozzle 9 as shown in FIG. 3. When applying the sealing material 8 it must be ensured that the whole surface of the insulation 3 visible at the end 7 of the pipe is covered properly, and also that the terminal edges 10 of the casing 4 and the region 11 where the inner pipe 2 projects out of the insulation 3 are coated with the sealing material 8. It is also important that the region around the said monitoring wires 5 is coated with the sealing material 8 so that a smooth transition 12 is formed around them, as shown in FIG. 4. As it cools down, the sealing material 8 adheres to the parts it covers and an effective seal 6 is formed thereby at the respective pipe ends 7 which substantially reduces the risk of moisture penetrating into the pipe insulation 3 with serious damage to the pipelines as a result. Expediently, the thickness T on the insulation is approximately 2-4 mm, and the sealing material should be able to withstand temperatures of up to approximately 120° C. from the fluid being transported inside the pipes.

The invention is not limited to the embodiment example described above and shown on the drawings, but can be modified within the framework of the following patent claims.

I claim:

1. A process for sealing the end of insulated pipes in the nature of hot pipes, which have a number of monitoring wires extending between an inner fluid-transporting pipe and a casing which surrounds insulation, out past the insulation on the insulating pipe, characterized in that a sealing material which withstands working temperatures on the pipes of up to approximately 120° C. and which contains a mixture of wax and bitumen, in a flowing state and heated to an appropriate temperature, is applied over the end of the pipe and around the monitoring wires at the region of said pipe ends in a manner that the sealing material when it sets adheres to the pipe ends alongside the insulation of the pipe and monitoring wires which project out from the pipe end, so that a liquid-impermeable layer is formed between the edges of the casing and the fluid-transporting pipe, connecting them together and providing an enclosing seal with smooth transitions at the respective monitoring wires.

2. A process according to claim 1, characterized in that the sealing material is heated up to approximately 160° C. before it is applied to the end of a pipe.

3. A process as claimed in claim 1, characterized in that the sealing material is squirted onto the sealing point, preferably by spraying.

4. A process as claimed in claim 1, characterized in that the quantity of sealing material applied is such, that a layer with a thickness of approximately 2–4 mm is formed when the material sets.

5. Means for carrying out the process according to claim 1, for sealing the end of insulated pipes, i.e. so-called hot pipes, which have a number of monitoring wire extending along the pipe between an inner fluid-transporting pipe and a casing which encloses insulation, out past the insulation on the said pipe, characterized in that the end seal consists of a heat-resistant bitumen-containing material which forms a watertight layer after application.

6. Means according to claim 6, characterized in that the sealing material consists of a mixture of wax and bitumen which is softened by heating it up to approximately 160° C.

7. Means according to claim 6, characterized in that the sealing material adheres to the surrounding parts when it sets.

8. Means according to claim 7, characterized in that the sealing material adheres to the surrounding parts when it sets.

* * * * *